July 15, 1924.
J. A. McDONALD
1,501,224
AGRICULTURAL IMPLEMENT
Filed May 16, 1922      2 Sheets-Sheet 2
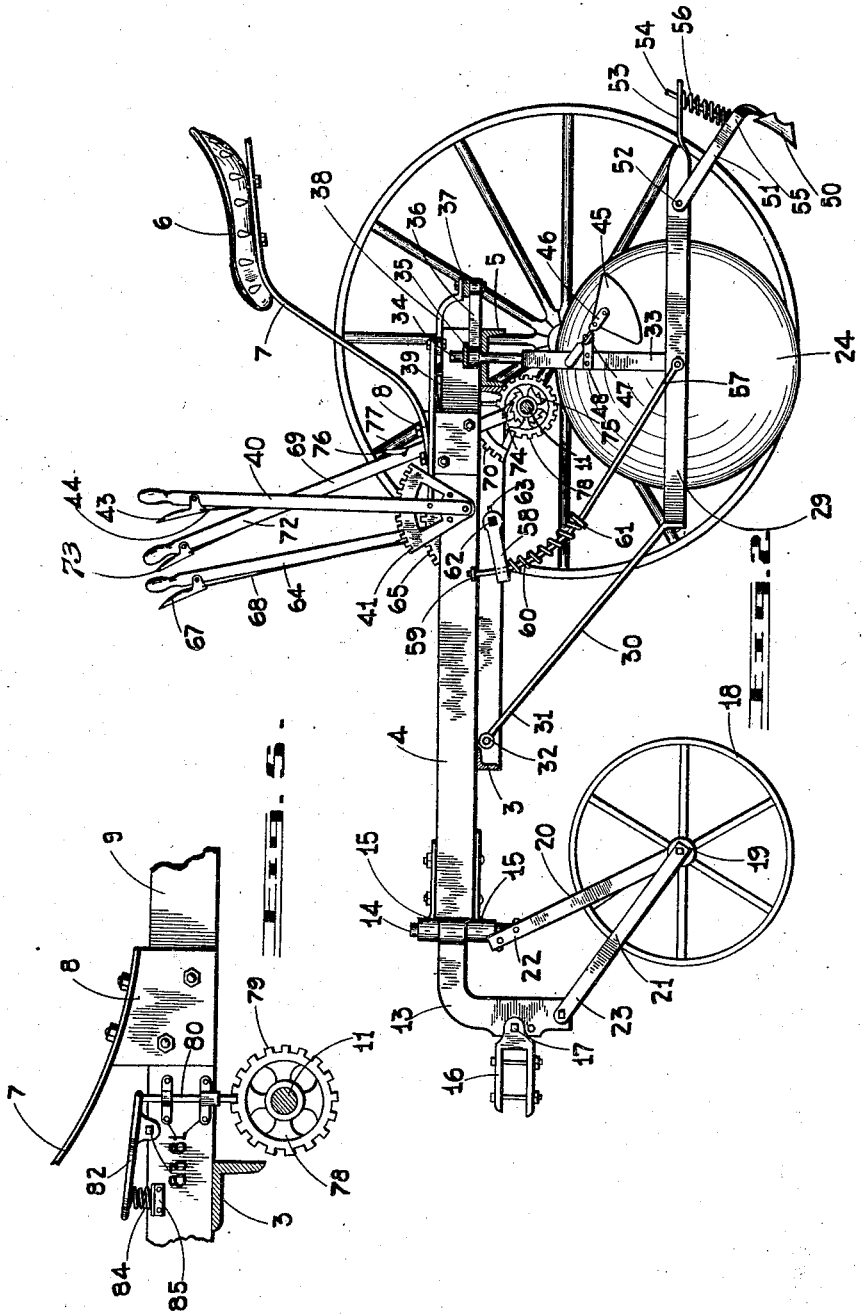
INVENTOR
JOHN A. McDONALD.
BY
*E. H. Bond*
ATTORNEY Patented July 15, 1924.

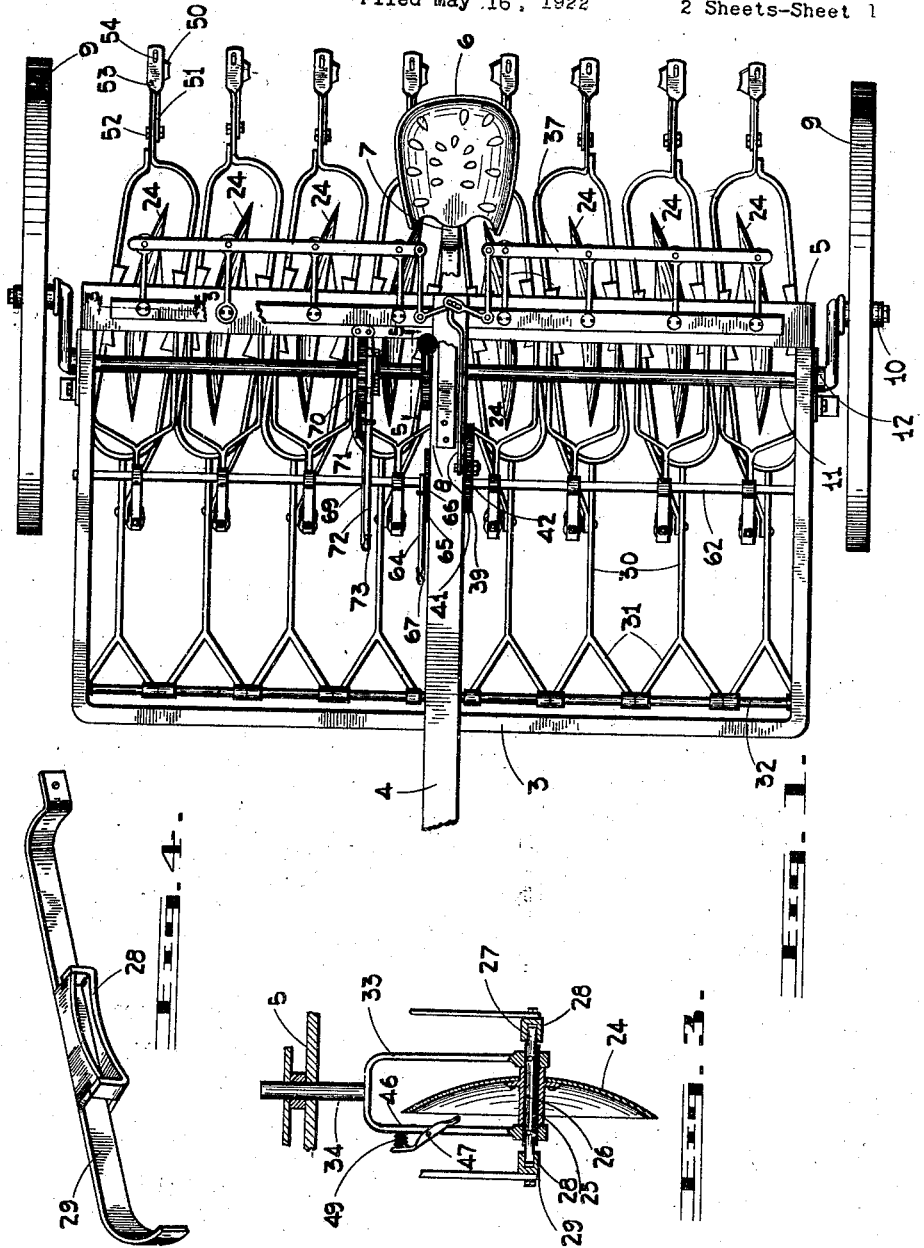

1,501,224

UNITED STATES PATENT OFFICE.

JOHN A. McDONALD, OF WESTBORO, ONTARIO, CANADA.

AGRICULTURAL IMPLEMENT.

Application filed May 16, 1922. Serial No. 561,446.

*To all whom it may concern:*

Be it known that I, JOHN A. MCDONALD, a citizen of the Dominion of Canada, residing at Westboro, in the county of Carleton and Province of Ontario, have invented certain new and useful Improvements in Agricultural Implements, of which the following is a specification.

This invention has relation to certain new and useful improvements in a disc cultivator and has for its primary object the provision of an agricultural implement of the character stated in which each disc may be carried in a separate frame with which is also connected a cultivating tooth; the disc frames being arranged in series and connected with means for adjusting the series of frames to position the discs at the proper angles.

The invention has for another object the provision of a disc cultivator of the character stated in which the frames carrying the discs may be resiliently mounted beneath the supporting frame structure and the tension on the disc frames readily regulated.

Another object of the invention resides in the provision of a disc cultivator of the character stated in which the operative parts may be readily raised to inoperative position and held in raised position during the transportation of the implement to another field or whenever it is desired to support the cultivator disc and cultivator teeth above the ground.

A further object of the invention resides in the provision of a disc cultivator of the character set forth in which the cultivator discs will be mounted in such a manner within their separate frames that all the discs may be turned together by operation of a disc turning lever provided within reach of the operator.

A still further object of the invention resides in the provision of a cultivator of the character set forth in which may be provided special means for raising the cultivator discs and the frames to various positions with respect to the supporting frame and rear axle and retaining the cultivator discs and frames in the position desired.

The invention has for a still further object the provision of a disc cultivator of the character stated in which the cultivator discs and frames together with the adjusting and tensioning means therefor may be carried below a main supporting frame from which the draft pin extends and connects with the forward guide wheel and draft members by which the draft animals may be connected with the implement.

A still further object of the invention resides in the provision of a disc cultivator of the character set forth which will be of comparatively simple and inexpensive construction as well as highly efficient in use and composed of the mimimum number of parts of simple construction.

With the foregoing and other objects in view as will appear as the description proceeds the invention consists in the novel construction, combination and arrangement of co-operating elements as hereinafter more specifically set forth, claimed and shown in the accompanying drawings forming a part of the present application and in which:

Figure 1 is a plan view of the cultivator with the forward portion of the draft beam and part carried thereby broken away.

Fig. 2 is a side elevation with the near ground wheel removed.

Fig. 3 is a detail sectional view substantially on the plane of line 3—3 of Figure 1 looking in the direction indicated by the arrows.

Fig. 4 is a detail perspective view of one side of the frame for one of the cultivator disc spindles.

Fig. 5 is a fragmentary detail perspective view substantially on the plane of line 5—5 of Figure 1 and looking in the direction indicated by the arrows; this view discloses the foot actuated releasing means for the rear axle.

Referring now to the drawings in which similar reference characters designate corresponding parts throughout the several views, 3 indicates the main frame which is of substantially rectangular form and from which the draft beam 4 is extended. The main frame 3 may be formed of angle iron or constructed in any other preferred manner. The main frame 3 also includes an inverted channel iron 5 across its rear portion. The channel iron 5 may constitute the rear side of the frame. The operator's seat 6 may be mounted on the seat supporting standard 7 secured on the beam 4, as shown at 8. The ground wheels 9 are mounted on the out-turned and off-set ends 10 of the rear axle 11. The rear axle 11 is mounted in suitable supporting brackets 12 depending from the ends of the main frame 3, near the rear side of the latter, as shown clearly in the drawings.

In order to provide for proper attachment of draft animals to the cultivator and also the guiding of the implement, an angular clevis carrying member 13 is carried on the pivot bolt 14 supported in suitable bearings 15 at the forward end of the main draft beam 4. The clevis 16 of conventional form, is suitably connected with the depending portion of the member 13, as shown at 17. A forward guide wheel 18 is mounted on the forward axle 19 which has its ends extended through the legs of the forks 20 and 21. The fork 20 has a stem 22 connecting with the lower end of the pivot bolt 14, while the stem 23 of the fork 21 connects with the lower extremity of the member 13, thereby providing for proper turning of the guide wheel 18 as the clevis 16 and the clevis carrying member 13 are turned with respect to the main draft beam 4.

The cultivator discs 24 are arranged in series beneath the opposite side portions of the channel iron 5 and each disc 24 is mounted in a separate frame, as will be described in detail. The hub 25 of each cultivator disc 24 is rotatably mounted on the disc spindle 26 which has reduced or flattened end portions 27 working in the arcuate guide members 28 located on the inner face of the side members of the cultivator disc frame 29, as shown clearly in Figures 3 and 4. The arcuate guide member 28 may be formed with the frame 29 as indicated in Figure 4 or formed separate and attached thereto, as may be desired. The cultivator frame 29 is of rectangular form and is suspended by a forwardly inclined suspending bar 30 having a bifurcated upper end 31 mounted on the transverse supporting bar 32. This bar 32 is extended through the forward portion of the main frame 3, as shown in Figures 1 and 2. Rigidly secured to the spindle 26 of the cultivator disc 24, at opposite sides of the disc hub 25, are the lower ends of the forked spindle turning member 33, the upstanding stem 34 of which works through the channel iron 5. This stem 34 is preferably squared to receive the socket member 35 of the turning arm 36. Each cultivator disc 24 is mounted in the same manner and the arms 36 for each series of cultivator discs 24 connect with an opposite bar 37. The operating bars 37 connect at their opposed ends with bell crank levers 38 which in turn are connected with and operated by a common control rod 39. This common control rod 39 connects with the controlling lever 40 which is pivoted to one side of the main draft beam 4 as shown in Figure 5. The lever 40 may be readily operated to turn the discs 24 in, either direction, thereby swinging the ends 27 of the spindles 26 within the arcuate guide members 28 of the frames 29 for the various cultivator discs 24. A rack segment 41 is provided for the latching member 42 of the lever 40 so that the lever may be locked in adjusted position. The usual form of latch releasing finger 43 is also provided on the lever 40 and is connected with the latch member 42 by the flexible connecting member 44.

A scraper blade 45 is provided for each cultivator disc 24 and mounted on an arm 46 pivoted, as shown at 47, to the supporting bracket arm 48 carried on one leg of the bifurcated frame member 33. A spring 49 is positioned between the opposite end of the arm 46 and the leg of the frame 33, whereby the scraper blades 44 may be resiliently retained in engagement with the concave face of the disc 24. A scraper blade 45 should be provided for each disc 24 and mounted in the manner stated. A discing tooth or cultivator tooth 50 is provided for each disc 44 and is carried on the downwardly and forwardly turned lower end of the supporting bar 51 pivoted at its forward upper end to the projecting rear end of the cultivator carrying frame 29, as shown at 52. The free extremity of the rearwardly extending end of the frame 29 is turned or twisted, as at 53, to receive the guide rod 54 extending upwardly from the lower portion of the supporting bar 51 and pivoted to the latter, as shown at 55. A tension spring 56 is extended around the guide rod 54 with one end bearing against the turned end 53 of the frame 29 while its opposite or lower end bears against the upper face or upper edge of the supporting bar 51 to exert a resilient pressure upon the lower end of the supporting bar 51. This will result in resiliently forcing the discing blade or cultivator blade 50 downwardly to operative position. A pin may be extended through the upper end portion of the guide rod 54 to prevent the latter from passing out of the turned end 53 of the frame 29.

For exerting a downward resilient pressure upon each cultivator disc 24 separately, a substantially arcuate rod 57 is provided for each disc 24 and is pivotally mounted at its lower bifurcated end to each side of the disc carrying frame 29, at a point opposite the center of the frame 24 within the frame 29 when said disc 25 is in its normal position. The upper end of the stem portion of the bar 57 is slidably engaged through a guide arm 58 and the bar 57 is provided with a stop collar 59 upon its upper extremity to prevent this end of the bar 57 from passing through the guide arm 58. A tension spring 60 is mounted on the rod 57 with one end bearing against the under face of the guide arm 58, while the opposite end of the spring 60 bears against a stop pin 61 extending through the stem of the bar 57, to exert a downward resilient pressure on the disc carrying frame 29 and thereby resiliently retain the disc 24 in operative position. A transverse supporting bar 62 is carried by the main frame 3 to support the several guide arms 58 and the latter are mounted on the bar 62 and secured in adjusted position by set screws 63 or other suitable means. In order to regulate the tension of the spring 60, a lever 64 is mounted on the bar 62 for turning the latter. This lever 64 is adapted to work over a rack segment 65 carried by the main beam 4 and the usual latch member 66 is carried by the lever 64 for engagement with the rack segment 65 to lock the lever 64 in adjusted position. The lever 64 also carries the conventional form of latch releasing finger 67, connected with the latch member 66 by a flexible connection 68, whereby the lever 64 may be readily released for operation to adjust or regulate the tension of the spring 60.

As a means for raising and lowering the entire main frame 3 and the parts carried thereby with respect to the ground wheels 9, the main lever 69 is provided and is loosely mounted on the main portion of the rear axle 11. The main lever 69 works over a stationary rack segment 70 which is mounted rigid with the channel iron 5 forming the rear side of the main frame 3, as shown in Figures 1 and 2 of the drawings. The lever 69 is adapted to be held in adjusted position by a suitable latch member 71 carried by the main lever 69. The latch member 71 is connected by a suitable flexible member 72, with the releasing finger 73 mounted on the main lever 69. This main lever 69 may be termed the raising and lowering lever. The lever 69 has a pawl 74 pivoted to its lower portion and normally engaged with the ratchet wheel 75 which is rigidly mounted upon the rear axle 11. The pawl 74 is connected with a pawl releasing finger 76 by a suitable connection member 77. The releasing finger 76 is pivoted upon the lever 69 and is so positioned that it may be operated by the foot of the operator to release the pawl from the ratchet wheel 75, when necessary. The rear axle 11 also carries a rigid wheel 78, which has peripheral spaced teeth adapted to receive therebetween a locking pin 80. The locking pin 80 works through suitable guide members 81 on the side of the main beam 4 and is controlled by a releasing pedal 82. The pedal 82 is pivoted on the main beam 4, as shown at 83 and is resiliently retained in operative position to hold the pin 80 downwardly and in engagement with the teeth 79 of the wheel 78, through the medium of the coil spring 84 working against one end of the pedal 82. This spring 84 is carried on a suitable support 85. Any other preferred means, however, may be employed to resiliently retain the pedal 82 in operative position. It is evident that the pedal 82 must be operated by the foot of the operator to release the wheel 78 before the rear axle 11 can be rotated in either direction.

The raising and lowering lever 69 should first be forced forward after being released from the rack segment 70, when it is desired to raise the cultivator discs 24 and blades 50 from operative position to a position above the surface over which the cultivator is to travel. This forward movement of the lever 69 will carry the pawl 74 over the stationary ratchet wheel 75 to catch in a forward tooth of the latter. Then, by operation of the pedal 82, the locking pin 80 may be withdrawn from the tooth 79 of the wheel 78. The lever 69 may then be drawn rearwardly while still released from the segment 70 to rotate the rear axle 11 and lower the rear ground wheels 9, thereby raising all of the operative parts of the cultivator. The pedal 82 should then be released to permit the pin 80 to again engage between the teeth 79 of the wheel 78, to prevent further rotation of the rear axle 11. If it is desired to raise the operative parts of the cultivator further from the surface, the lever 69 may be again moved forwardly and the operation repeated. This will provide for a gradual raising of the operative parts of the cultivator to inoperative position.

When it is desired to lower the operative parts of the cultivator, the raising operation should be reversed. That is, the pin 80 should be withdrawn from the wheel 78 by operation of the pedal 82 and the lever 69 then released from the rack segment 70 and moved forwardly with the pawl 74 engaged with the ratchet wheel 75. The pedal 82 should then be released to permit the pin 80 to engage the teeth 79 of the wheel 78. The releasing finger 76 should then be engaged by the foot of the operator to withdraw the pawl 74 from the ratchet wheel 75. Then the lever 69 should be released from the rack segment 70 and drawn rearwardly to permit a new engagement of the pawl 74 with the ratchet wheel 75. The pedal 82 may be again operated to release the pin 80 from the wheel 78 and the lever 69 moved forwardly to permit a further lowering of the operative parts of the cultivator. This operation may be repeated until the operative parts are lowered to the position desired.

The cultivator discs 24 may be readily turned to the position desired by operation of the disc turning lever 40, previously described in detail. By operation of the tension regulating lever 64, the tension on the cultivator discs 24 and cultivator teeth 50 may be readily regulated as desired and as previously stated in detail. It may also be stated at this time that the cultivator may be assembled with the discs for each series or each side of the cultivator positioned as inwardly turned discs or outwardly turned discs, as desired. In the present case the discs are shown as inwardly turned discs. It is also evident that the rear ends of the cultivator carrying frames 29 may be extended at any desired angle so as to properly position the cultivator teeth 50. Furthermore it will be evident from the disclosure that each cultivator disc 24 and the tooth 50 for the same may have a free resilient vertical movement with its frame independent of the other discs and disc carrying frames.

It is believed that the complete construction and operation of the cultivator will be apparent from the foregoing description in connection with the accompanying drawings, without further detailed explanation. It may be briefly stated, however, that the cultivator may be drawn by draft animals in the usual manner connected with the forward portion of the cultivator, as previously stated.

While the preferred embodiment of the invention has been shown and described it is to be understood that minor changes in the details of construction and arrangement of parts may be resorted to within the scope of what is claimed without departing from the spirit of the invention.

What I claim as new is:

1. An agricultural implement comprising a main frame, a rear axle having offset ends, ground wheels mounted on the offset end of said axle, said main frame being mounted on said axle, auxiliary frames suspended from said main frame, cultivator discs mounted within said suspended frames for limited turning movement therein, means for turning said discs in series to adjust the discs within said suspended frames and means to exert a resilient downward pressure on the auxiliary frames and arcuate rods for the support of said last-named means and guides for said arcuate rods intermediate their ends.

2. An agricultural implement comprising a main axle, a main frame mounted on said axle, auxiliary frames suspended from said main frame, cultivator discs mounted in the auxiliary frames, means for turning the cultivator discs in series within said suspended frames, means for regulating the position of said suspended frames with respect to said main frame and the axle, ground wheels carried by said main axle, arcuate rods pivotally mounted at their lower ends and slidably guided at their upper end, springs around said rods, guides for said arcuate rods intermediate their ends and draft attaching means mounted on said main frame.

3. An agricultural implement comprising a main axle, a main frame mounted on said axle, auxiliary frames suspended from said main frame, cultivator discs mounted in the auxiliary frames, means for turning the cultivator discs in series within said suspended frames, means for regulating the position of said suspended frames with respect to said main frame and the axle, ground wheels carried by said main axle, draft attaching means mounted on said main frame and means for exerting a resilient downward pressure on said suspended frames and arcuate rods pivotally mounted at their lower ends and around which said last means are positioned, and guides for said arcuate rods intermediate their ends.

4. An agricultural implement comprising a main axle, a main frame mounted on said axle, auxiliary frames suspended from said main frame, cultivator discs mounted in the respective auxiliary frames, means for turning the cultivator discs in series within said suspended frames, means for regulating the elevation of said suspended frames with respect to said main frame and the axle, ground wheels carried by said main axle, draft attaching means mounted on said main frame, means for exerting a resilient downward pressure on said suspended frames, a cultivator tooth resiliently mounted on each suspended frame rearwardly of the cultivator disc carried therein and means to govern the resilient pressure exerted upon said suspended frames and arcuate rods pivotally mounted at their lower ends and around which said last means are positioned, and guides for said arcuate rods intermediate their ends.

5. An agricultural implement comprising a main frame, a rear axle having offset ends, ground wheels mounted on the offset ends of said axle, said main frame being mounted on said axle, auxiliary frames suspended from said main frame, cultivator discs mounted within said suspended frames for limited turning movement therein, means for turning said discs in series, means to exert a resilient downward pressure on the auxiliary frames and arcuate rods pivotally mounted at their lower ends and around which said last means are positioned, guides for said arcuate rods intermedite their ends and means for raising and lowering of the auxiliary frames and the main frame to various positions with respect to said rear axle.

6. An agricultural implement comprising a main frame, said main frame carried on an axle, means for raising and lowering the said main frame, auxiliary frames supported from said main frame, each of said auxiliary frames provided with a cutting disc, arcuate rods pivotally mounted at their lower ends and slidably guided at their upper end, springs around said rods, guides for said arcuate rods intermediate their ends and said auxiliary frames so connected to said main frame as to permit raising or lowering of them independently of each other.

7. An agricultural implement comprising a main frame suitably mounted on an axle, auxiliary frames supported from said main frame in such a manner as to allow for raising or lowering of said auxiliary frames independently of each other, cutting discs carried on each of said auxiliary frames and means for tensioning said frames in a downward position and arcuate rods for the support of said last-named means and guides for said arcuate rods intermediate their ends.

8. An agricultural implement comprising a main frame suitably mounted on an axle, auxiliary frames supported from said main frame in such a manner as to allow for raising or lowering of said auxiliary frames independently of each other, cutting discs carried on each of said auxiliary frames, means for tensioning said frames in a downward position and arcuate rods for the support of said last-named means, guides for said arcuate rods intermediate their ends and means of turning said discs relative in their respective auxiliary frames.

9. An agricultural implement comprising a main frame, supporting means for said main frame, cutting discs suitably supported from said main frame in such a manner that each of said cutting discs may raise or lower independently of each other during the normal travel in the operation of said agricultural implement, arcuate rods for the support of said last named means, and guides for said arcuate rods intermediate their ends.

10. An agricultural implement comprising a main frame, auxiliary supporting means connected from said main frame, discs each mounted on an independent axle and supported to turn in one of said auxiliary frames and arcuate rods for the support of said last-named means and means for controlling the turning of said discs.

11. An agricultural implement comprising a main frame suitably mounted in an axle, auxiliary frames supporting from said main frame in such a manner as to allow for raising or lowering of said auxiliary frames independently of each other, cutting discs carried in each of said auxiliary frames, means of tensioning said frames in a downward position and arcuate rods for the support of said last-named means, guides for said arcuate rods intermediate their ends, and means for raising and lowering said auxiliary frames as a unit.

12. An agricultural implement comprising a main frame suitably mounted on an axle, auxiliary frames supported from said main frame in such a manner as to allow for raising or lowering of said auxiliary frames independently of each other, cutting discs carried in each of said auxiliary frames, means for tensioning said frames in a downward position, and arcuate rods for the support of said last-named means, means of turning said discs relative in their respective auxiliary frames and means for raising or lowering said auxiliary frames as a unit.

In testimony whereof, I hereunto affix my signature in the presence of two witnesses.

JOHN A. McDONALD.

Witnesses:
M. McMILLAN,
F. C. THOMPSON.